(12) United States Patent
Kaaden et al.

(10) Patent No.: US 6,347,181 B1
(45) Date of Patent: Feb. 12, 2002

(54) TIME-COMPRESSED SIGNAL RECORDING AND REPRODUCING PROCESS

(75) Inventors: Jürgen Kaaden; Klaus Oldermann, both of Villingen-Schwenningen (DE)

(73) Assignee: Deutsche Thomson-Brandt GmbH, Villingen-Schwennigen (DE)

( * ) Notice: Subject to any disclaimer, the term of this patent is extended or adjusted under 35 U.S.C. 154(b) by 0 days.

(21) Appl. No.: 08/481,455

(22) PCT Filed: Jan. 31, 1994

(86) PCT No.: PCT/EP94/00267

§ 371 Date: Oct. 27, 1995

§ 102(e) Date: Oct. 27, 1995

(87) PCT Pub. No.: WO94/18793

PCT Pub. Date: Aug. 18, 1994

(30) Foreign Application Priority Data

Feb. 8, 1993 (DE) .......................................... 43 03 453

(51) Int. Cl.[7] ................................................ H04N 5/91
(52) U.S. Cl. .......................................... 386/68; 386/109
(58) Field of Search ................................. 358/335, 312; 360/9.1, 10.1, 10.3, 70, 33.1, 8; 386/1, 6, 7, 8, 33, 68, 46, 81, 109, 111, 112, 113; H04N 5/76, 5/92, 5/783, 5/91

(56) References Cited

U.S. PATENT DOCUMENTS

| | | | |
|---|---|---|---|
| 4,703,465 A | 10/1987 | Parker | 369/30 |
| 4,785,358 A | 11/1988 | Ninomiya | 358/335 |
| 4,949,187 A | 8/1990 | Cohen | 358/335 |
| 5,083,225 A * | 1/1992 | Morisaki et al. | 360/64 |
| 5,337,199 A * | 8/1994 | Arai et al. | 360/8 |
| 5,341,248 A * | 8/1994 | Amada et al. | 360/33.1 |
| 5,359,471 A * | 10/1994 | Hasegawa | 360/64 |
| 5,392,163 A * | 2/1995 | Higuchi et al. | 360/10.1 |
| 5,532,835 A * | 7/1996 | Nakagaki et al. | 358/335 |

FOREIGN PATENT DOCUMENTS

| | | | |
|---|---|---|---|
| DE | 3820835 | 1/1989 | |
| EP | 0454460 | 10/1991 | |
| EP | 0488337 | 6/1992 | |
| EP | 0521191 | 1/1993 | |
| JP | 0 534 620 A2 * | 3/1993 | G11B/5/86 |

* cited by examiner

*Primary Examiner*—Young Lee
(74) *Attorney, Agent, or Firm*—J. S. Tripoli; F. A. Wein

(57) ABSTRACT

Recording is carried out with time compression at an increased tape longitudinal speed and an increased head drum speed of rotation. Reproduction is carried out at a set tape longitudinal speed and at the same increased or slightly reduced head drum speed of rotation. Conversion into real time and the frequency position for real time reproduction are ensured by electronic memories into which the signal repeatedly generated by overscanning is written and from which it is read out during reproduction.

12 Claims, 3 Drawing Sheets

TIME-COMPRESSED SIGNAL RECORDING AND REPRODUCING PROCESS

BACKGROUND

It is known to transmit a signal, in particular a digital television or radio broadcast signal, via satellites or broadband transmission links, time-compressed for example by a factor of 20 and with a correspondingly increased frequency spectrum, for better utilization of the satellites and transmission links. In the case of television transmission, there would then be required for a feature film lasting 100 minutes a time period of only about 5 minutes. At the location where such a signal is received it is desired to record the signal, received in time-compressed form, especially as the said transmission often takes place during the night. Recording of such a compressed, broadband signal is not readily possible with conventional recorders. In addition, it is necessary to convert the signal transmitted in time-compressed form back into real time for reproduction via a customary receiver, that is to expand it again to the original time duration and the frequency spectrum of a standardized signal.

SUMMARY OF THE INVENTION

The object of the invention is to provide for such a transmission system with time-compressed transmission a process for recording and converting to real time which requires as few modifications as possible in a customary recorder.

In the solution according to the invention, the signal transmitted in time-compressed form is thus initially recorded without changing the time base by a recorder with helical-scan recording at a tape longitudinal speed increased by a factor with respect to the nominal tape longitudinal speed and at an increased head drum speed of rotation. The increase in the tape longitudinal speed and head drum speed of rotation makes it possible to record the time-compressed signal of greatly increased bandwidth. The tape longitudinal speed has in this case, for example, 4 times the value of the nominal tape longitudinal speed. The reproduction takes place at a tape longitudinal speed reduced with respect to the recording by a factor of, for example, 20. For example, the tape longitudinal speed during reproduction is reduced to ⅕ of the nominal tape longitudinal speed. The said factor of 4 in the increase of the tape longitudinal speed during recording and the factor of 5 in the reduction of the tape longitudinal speed during reproduction then give the said factor of 20. Reproduction takes place, however, at a head drum speed of rotation which is unchanged or changed little with respect to recording. The complete signal is then expanded to real time, for example 5 minutes to 100 minutes. However, the transmitted video signal of a frame continues to have the reduced value caused by the time-compressed transmission, of for example 1 ms. This signal would thus not be suitable initially for reproduction in a television receiver. Since part of the signal is in each case scanned in the reduced time of, for example, 1 ms, but the magnetic tape runs at the reduced tape longitudinal speed, associated signal components are scanned one after the other with overseaming (FIG. 4). In a further step of the invention, this signal is then fed to an electronic memory, into which, for example, during the standard duration of a frame of 20 ms 20 signal sections (FIG. 4) are read. These signals are then read out from the memory with the nominal frame duration of, for example, 20 ms.

The modified video recorder consequently assumes the task of expanding the signal for a transmission overall to real time. The subsequent electronic memory meanwhile assumes the task of converting, for example, in each case the video signal of a frame back to the nominal frame duration of 20 ms. By this sharing of the tasks on the one hand by a modified video recorder and on the other hand by an electronic memory, an inexpensive solution is achieved, in which in particular only few modifications are necessary to the customary video recorder.

Altogether, the following advantages are obtained by the solution according to the invention. The components and modules located in the signal path, such as for example the heads, the head drum, the rotation transformers of the head drum and the signal amplifiers have to be designed only for a narrow frequency range, since the video recorder operates only in the high frequency range of the time-compressed signal. If, in contrast to the invention, the video recorder were also to carry out the conversion to real time and to the low frequency position, these components would have to be designed for the high frequency range of the time-compressed signal and for the much lower frequency range of the customary television signal and, as a result would be extremely complicated and expensive. It is therefore also not necessary to provide separate heads for recording and reproduction. The tape longitudinal speed in the recorder is admittedly different by the said factor of, for example, 20. However, this does not give rise to any appreciable extra expenditure, because even on customary video recorders the capstan drive covers tape longitudinal speeds which are different by such a factor for special functions such as searching or single-frame advancement.

In the recording of a digital signal with consecutive numbering of the individual frames, it can be ensured even without great expenditure that the fast reading in of the time-compressed signal from the recorder and the slow reading out of the time-expanded signal for reproduction take place correctly with regard to the successive frames. It is admittedly possible for the video signals of some frames supplied by the recorder not to be correct or to suffer from interference. Since, however, during reproduction the video signal of a particular frame is multiply scanned and fed to the memory, it is ensured that sufficiently time-compressed frames with the correct video signal are always available. It is in this case also possible to feed the scanned video signal to an evaluation circuit, which initially checks the successive video signals of various time intervals and feeds to the memory only the video signal or signals which are found to be satisfactory. In principle, for a particular frame, the electronic memory only requires a single one of the video signals scanned one after the other. The invention can be used for a video signal and for an audio signal and is suitable in particular for digital signals of this type.

BRIEF DESCRIPTION OF THE DRAWINGS

The invention is explained below by the example of a television video signal with reference to the drawing, in which.

DETAILED DESCRIPTION OF THE PREFERRED EMBODIMENT(S)

Figure 1:
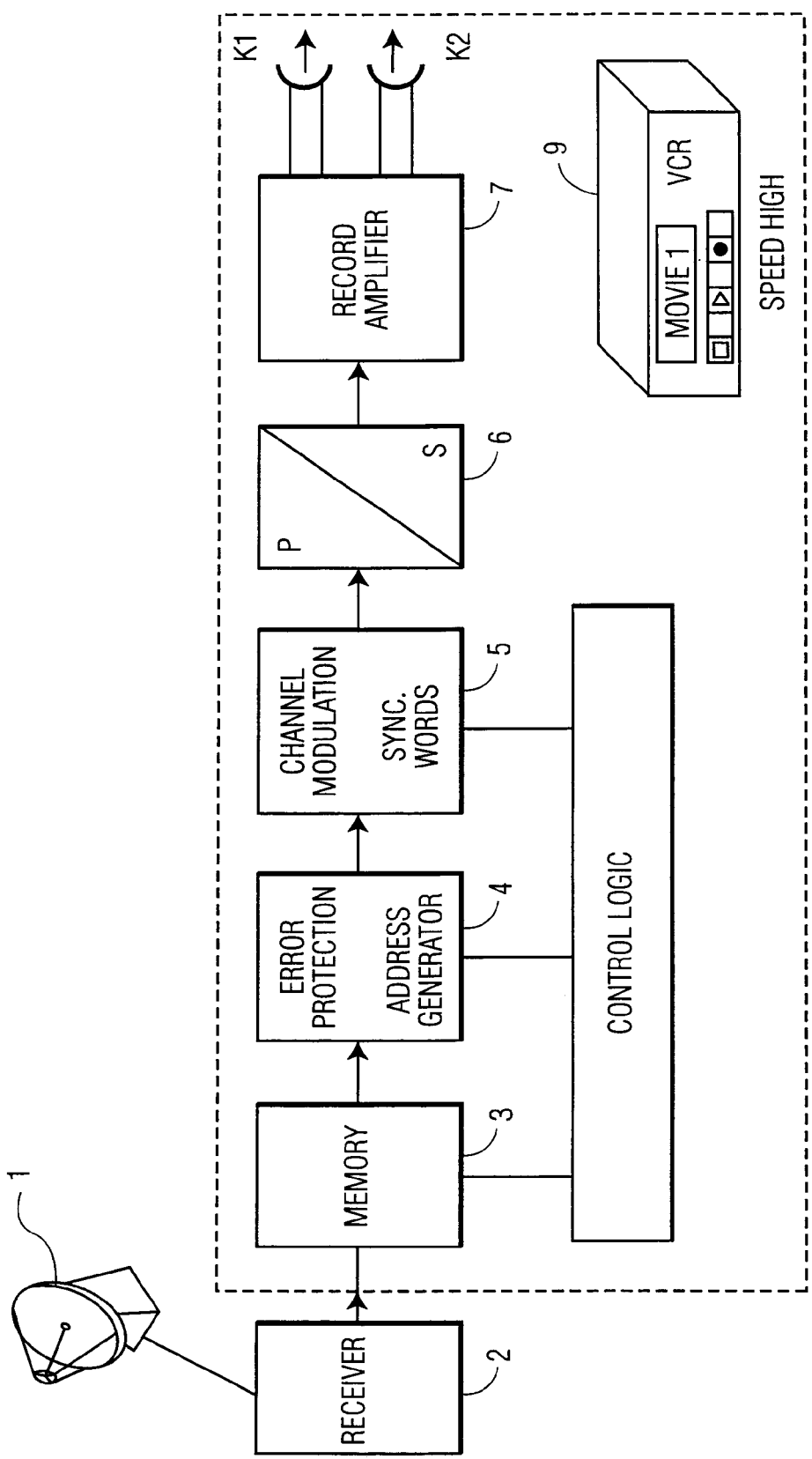
FIG. 1 shows a block diagram for the receiving station of the transmitted signal for the recording on the video recorder.

In FIG. 1, the described video signal, which is time-compressed altogether by a factor of 20, is received from a satellite (not shown) by the receiving antenna 1. This signal is available at the digital output of the receiver 2. The transmission takes place preferably with a multi-carrier system, each individual carrier M-PSK (m-ary-phase shift-keying) or M-QAM (m-state-quaternary-amplitude-modulation) being modulated. The digital signal from the output of the receiver 2 is written to the memory 3, which can receive the information of a plurality of tracks, preferably four, and is of a so-called ping-pong structure. This means that the first part of the memory is written to, while the second, equally large area is read from. With the reading out of a timing signal, derived from the receiver signal, the two memory halves exchange their function. The servo system is likewise synchronized to this signal, so that switching over always takes place at the beginning of a track. In the following error protection stage 4, groups of data are combined. By adding data words by the so-called "reed solomon code" method and inserting address information, a block format is formed.

In the channel modulation stage 5, a spectral adaptation of the signal to the properties of the magnetic tape channel takes place. In stage 5, each block has added to it a synchronization word, which is the same for all the blocks and can be easily detected during reproduction. The 10-bit wide data words are converted in the parallel/serial converter 6 into a serial data stream. This data stream passes via the record amplifiers 7 to the magnetic heads K1, K2 of the video recorder 9 and is recorded there in the way described. The video recorder 9 in this case operates preferably with a tape longitudinal speed which is equal to four times the nominal tape longitudinal speed, while the head drum speed of rotation is increased by an identical factor. The received time-compressed video signal is consequently recorded by the recorder 9 during the shortened transmission time, of for example 5 minutes in the case of a film of 100 minutes in real time.

Figure 2:
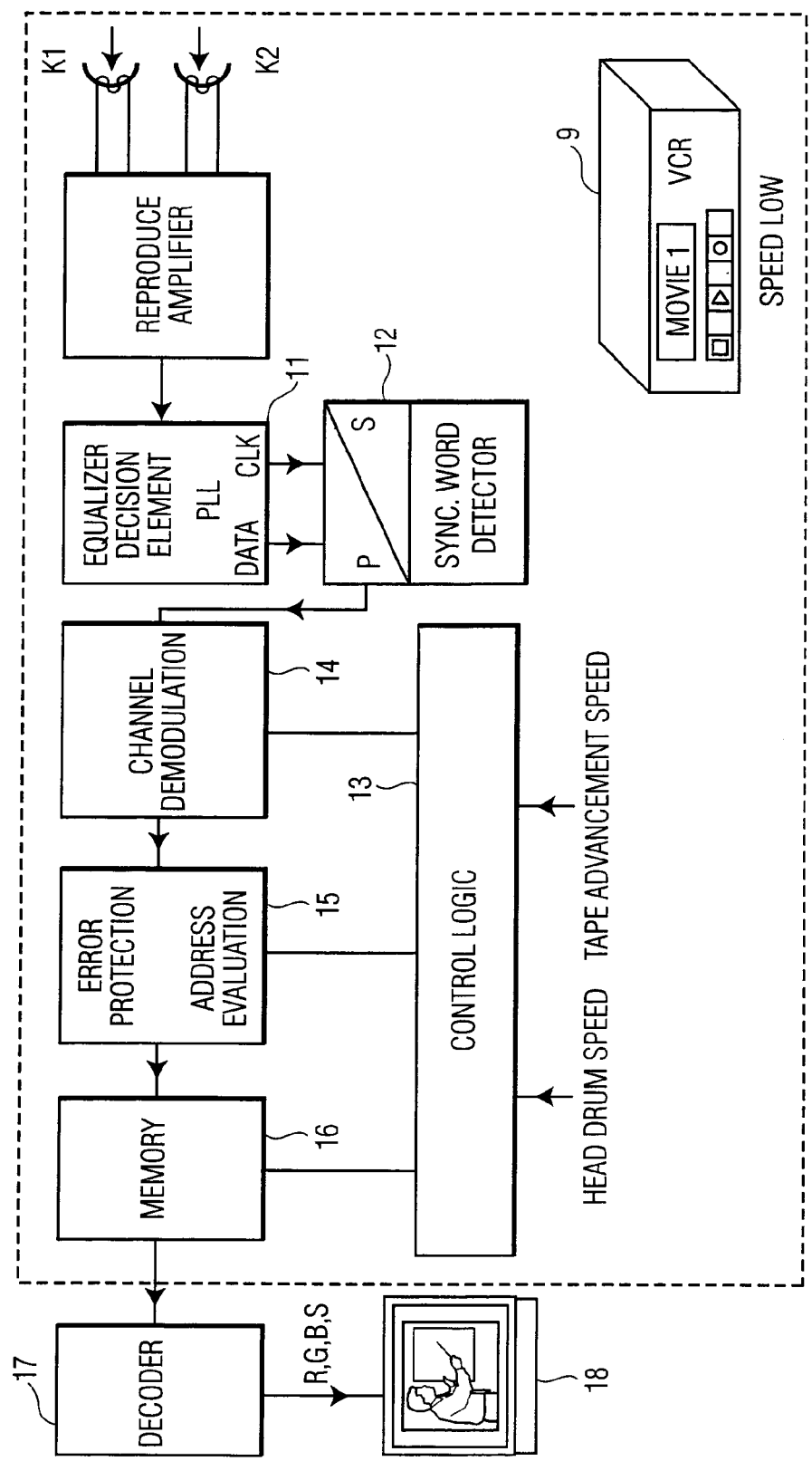
FIG. 2 shows the block diagram for the subsequent reproduction with the conversion to real time.

FIG. 2 shows the block diagram for the reproduction and conversion of the signal to real time and the original frequency range of a standardized television signal. The video recorder 9 now operates at a tape longitudinal speed which is 1/5 of the nominal tape longitudinal speed, while the head drum speed of rotation remains unchanged with respect to the recording according to FIG. 1. The time expansion of the complete signal to real time, that is for example from 5 minutes to 100 minutes, is achieved by the factor of 4 in the increase of the tape longitudinal speed during the recording according to FIG. 1 and the factor of 5 in the reduction of the tape longitudinal speed during the reproduction according to FIG. 2, in each case referred to the nominal tape longitudinal speed. The signal scanned by the heads 8, which although overall it takes up the real time is still time-compressed with regard to the video signal for a frame and has the high frequency position, passes via the reproduce amplifier 10 to the equalizer/decision element and PLL circuit 11. The circuit 11 supplies the data signal and the clock Clk to the parallel/serial converter 12, which interacts with a synchronization word detector 13. The signal from the output of the converter 12 passes via the channel modulator 14 to the circuit 15 for error protection and for address evaluation. The output signal of the circuit 15 passes to the electronic memory 16. In the memory 16, consequently the video signals of the successive frames scanned from the tape are read in one after the other, for example during the nominal frame duration of 20 ms 20 signals each with a duration of 1 ms, the information of which respectively overlaps one another. The video signal is subsequently read out from the memory 16 during the nominal frame duration of, for example, 20 ms. At the output of the memory 16 there is thus available again a signal which has the nominal frame duration necessary for reproduction, of for example 20 ms, and also is overall expanded to real time. This signal passes to the decoder 17, which supplies a customary RGBS signal for the reproduction by the television receiver 18.

Figure 3:
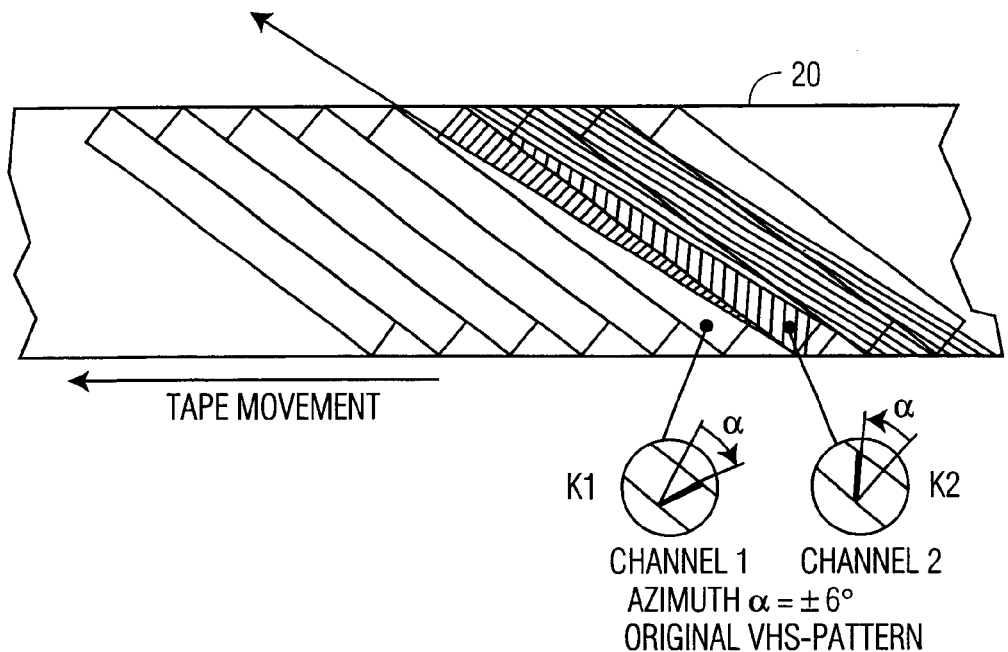
FIG. 3 shows the track diagram in the multiple scanning of the magnetic tape during reproduction and FIG. 4 shows wedge-shaped envelope curves of the signal scanned during reproduction from the magnetic tape for successive scannings.

FIG. 3 shows the track pattern of the helical tracks on the magnetic tape 20 of the recorder 9 according to FIGS. 1, 2 at 1/5 of the nominal tape longitudinal speed and 1/4 of the head drum speed of rotation. During reproduction, the video heads K1, K2 pass five times over a track before they leave this track entirely. The track angles during recording and reproduction do not coincide, so that only track segments are scanned and wedge-shaped envelope curves of the scanned reproduction signal are produced.

Figure 4:
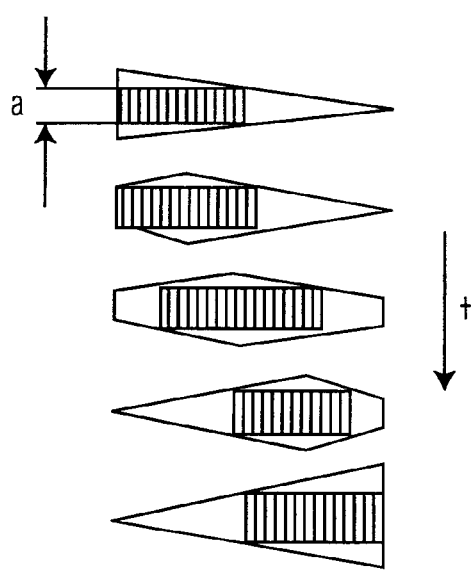

FIG. 4 shows the wedge-shaped progression of the envelope curve of the reproduction signal for five successive helical track scannings scanned from the tape 20. Due to the slow tape advancement, several regions come into the maximum one after the other. Since a minimum level a is adequate for reliable reproduction, overlaps occur and consequently permit a complete reproduction of the recorded signal. It is evident that all the necessary information can be obtained without a track following system by overlapping, phase-shifted scannings of the tracks. A similar pattern of the overlapping maxima, only in greater number, is obtained with an altered head drum speed of rotation, for example 10 maxima at 1/2 head drum speed and 20 maxima at full head drum speed.

A specific solution is described in detail below.

The reproduction signal emitted by the heads (single-channel recording, 2 heads, 183° angle of wrap), is linearly amplified and corrected in the equalizer 11. Amplitude losses of low-frequency and high-frequency signal components are balanced out here. The group delay in the operating range is linearized and noise components are eliminated by a roll-off filter.

The following decision element obtains a digital signal, which is used in the PLL stage for clock recovery. The data stream in serial form is searched on the basis of the synchronization words, which control the serial/parallel converter 12 and the channel demodulator 14. Here the conversion back to 8-bit wide data words takes place. In the error correction stage, the read parity information is compared with that currently calculated, and if appropriate a correction is carried out. The data subsequently pass into the output memory 16 and are sent from the latter with the time-expanded read clock into the video decoder. This reverses the process described as data reduction and, with the R,G,B,S signals obtained, drives the display.

As described for the recording, a ping-pong memory is also in use during the reproduction. The data written by the reproduction system at high speed into the memory and in principle repeated multiply thereby, are read out by the video decoder 17 at low speed. It provides the read clock for this. The data may in this case be read from the memory with a continuous clock or with a clock burst of correspondingly higher frequency.

The switching over of the memory (reading out of ping simultaneously with writing of pong, or vice versa) takes place in the fixed time-slot pattern of preferably one or multiple field switching pulse(s). (50 Hz system=20 ms, 40 ms . . . ). This control signal is generated by the video decoder 17 itself, which may be designed as an MPEG decoder.

In order that new data can be read out from the memory 16, current new data must be available. After each memory switch-over, therefore the write access is enabled. Data sections which have been read and found to be correct or had their errors corrected are written block by block to the associated address in the memory. Each written block section is additionally marked in a control memory. As soon as all the control memory addresses are set, the writing operation ends.

It is likewise possible to reactivate the tape advancement only when a new item of information is desired. Consequently, the filling level of the memory controls the tape advancement speed. This is of interest in particular whenever the memory can hold a relatively large volume of data, for example that of 8 tracks. Owing to the overscanning performed, a continuous data signal can be written to the memory up to, for example, about 8 times the normal reproduction speed (2.5 times overscanning at head drum 100 rps). If the said memory has the capacity of 8 tracks, the video decoder can diversely process per memory switching pulse the information of 8 frames: selection of one of 8 (quick-motion in jumps). All 8 per switching interval (quick-motion continuously). Averaging from 8 per switching interval. This great storage capacity is likewise suitable for the freezing of 8 frames, in that each of the associated memory sections is randomly available. Selection of one of 8 (single-frame analysis, tape advancement held).

What is claimed is:

1. Time-compressed signal recording and reproducing process by a video recorder with helical track recording at a nominal tape longitudinal speed and a nominal head drum speed of rotation, comprising the steps of:
    a) recording in time-compressed form at a tape longitudinal speed increased by a factor with respect to a nominal tape longitudinal speed and at an increased head drum speed of rotation,
    b) reproduction at a tape longitudinal speed reduced with respect to the recording by a factor, but at an increased head drum speed of rotation, and
    c) conversion to the time base and the frequency position for real-time reproduction with an electronic memory, to which the signal obtained multiply by overscanning a track is written and is read out with a nominal clock rate during real time.

2. Process according to claim 1, wherein the head drum speed of rotation during reproduction is substantially not altered with respect to the head drum speed of rotation during recording.

3. Process according to claim 1, wherein the head drum speed of rotation during reproduction is about ½ or ¼ of the head drum speed of rotation during recording.

4. Process according to claim 1, wherein, during reproduction, a reproduction signal supplied by the recorder is coupled to an evaluation circuit, which checks successive, partly identical video signals of a section or block and selects and feeds to the memory only the signals found to be satisfactory.

5. Process according to claim 1, wherein the reading out of the data from the memory takes place by a video decoder with a continuous clock pulse sequence or with a clock burst of higher frequency.

6. Process according to claim 1, wherein tape advancement is controlled in the recorder as a function of a filling level of the memory and is activated whenever new data are required for writing into the memory.

7. Time-compressed signal recording and reproducing apparatus for a video recorder with helical track recording at a nominal tape longitudinal speed and a nominal head drum speed of rotation, comprising:
    means for recording in time-compressed form at a tape longitudinal speed increased by a factor with respect to the nominal tape longitudinal speed and at an increased head drum speed of rotation,
    means for reproduction at a tape longitudinal speed reduced with respect to the recording by a factor at an increased head drum speed of rotation,
    means for conversion to a time base and a frequency position for real-time reproduction including an electronic memory with a signal obtained being multiplied by overscanning a track which is written and is read out with a nominal clock rate during real time.

8. Apparatus according to claim 7, wherein the head drum speed of rotation during reproduction is not altered with respect to the head drum speed of rotation during recording.

9. Apparatus according to claim 7, wherein the head drum speed of rotation during reproduction is about ½ to ¼ of the head drum speed of rotation during recording.

10. Apparatus according to claim 7, wherein during reproduction, reproduction signal supplied by the recorder is coupled to an evaluation circuit which checks successive, partly identical video signals of one of a section and a block, and selects and feeds a memory only signals found to be satisfactory.

11. Apparatus according to claim 7, wherein reading out of the data from the memory is accomplished by a video decoder with one of a continuous clock pulse sequence and with a clock burst of higher frequency.

12. Apparatus according to claim 7 wherein tape advancement is controlled in the recorder as a function of a filling level of the memory and is activated whenever new data are required for writing into the memory.

* * * * *